United States Patent
Watson

(10) Patent No.: US 9,171,547 B2
(45) Date of Patent: *Oct. 27, 2015

(54) MULTI-PASS SPEECH ANALYTICS

(75) Inventor: Joseph Watson, Alpharetta, GA (US)

(73) Assignee: VERINT AMERICAS INC., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/271,681

(22) Filed: Oct. 12, 2011

(65) Prior Publication Data

US 2012/0026280 A1 Feb. 2, 2012

Related U.S. Application Data

(63) Continuation of application No. 11/924,201, filed on Oct. 25, 2007, which is a continuation of application No. 11/540,322, filed on Sep. 29, 2006, now Pat. No. 7,752,043.

(51) Int. Cl.
*G10L 17/00* (2013.01)
*G10L 15/32* (2013.01)

(52) U.S. Cl.
CPC .................... *G10L 15/32* (2013.01)

(58) Field of Classification Search
CPC ....... G10L 17/00; G10L 17/005; G10L 17/14; G10L 17/26
USPC .......... 704/251, 270, 246, 250, 231, 235, 273
See application file for complete search history.

(56) References Cited

U.S. PATENT DOCUMENTS

| | | |
|---|---|---|
| 5,740,318 A | 4/1998 | Naito et al. |
| 5,757,644 A | 5/1998 | Jorgensen et al. |
| 5,918,222 A | 6/1999 | Fukui et al. |
| 6,100,891 A | 8/2000 | Thorne |
| 6,324,282 B1 | 11/2001 | McIllwaine et al. |
| 6,721,734 B1 | 4/2004 | Subasic et al. |
| 6,751,614 B1 | 6/2004 | Rao |
| 6,823,054 B1 | 11/2004 | Suhm et al. |
| 7,039,166 B1 | 5/2006 | Peterson et al. |
| 7,346,509 B2 | 3/2008 | Gallino |
| 7,451,085 B2 * | 11/2008 | Rose et al. ............ 704/244 |
| 7,577,246 B2 | 8/2009 | Idan et al. |
| 7,613,717 B1 | 11/2009 | Reed et al. |
| 7,664,747 B2 | 2/2010 | Petras et al. |
| 7,720,214 B2 | 5/2010 | Ricketts |
| 7,865,510 B2 | 1/2011 | Hillary et al. |
| 7,913,063 B1 | 3/2011 | Lyerly |
| 8,023,636 B2 | 9/2011 | Koehler et al. |
| 8,054,964 B2 | 11/2011 | Flockhart et al. |
| 8,055,503 B2 | 11/2011 | Scarano et al. |
| 8,060,364 B2 | 11/2011 | Bachar et al. |
| 8,108,237 B2 | 1/2012 | Bourne et al. |

(Continued)

OTHER PUBLICATIONS

Official U.S. Official Action, dated May 22, 2013, issued in related U.S. Appl. No. 13/215,192.

*Primary Examiner* — Qi Han
(74) *Attorney, Agent, or Firm* — Meunier Carlin & Curfman

(57) ABSTRACT

Included are embodiments for multi-pass analytics. At least one embodiment of a method includes receiving data associated with a communication, performing first tier analytics on the received data, and performing second tier analytics on the received data, where the second tier analytics determines different characteristics of the received data than the first tier analytics.

6 Claims, 16 Drawing Sheets

(56) References Cited

U.S. PATENT DOCUMENTS

| | | |
|---|---|---|
| 8,200,527 B1 | 6/2012 | Thompson et al. |
| 8,219,555 B1 | 7/2012 | Mianji |
| 8,396,741 B2 | 3/2013 | Kannan et al. |
| 8,417,713 B1 | 4/2013 | Blair-Goldensohn et al. |
| 8,463,595 B1 | 6/2013 | Rehling et al. |
| 8,463,606 B2 | 6/2013 | Scott et al. |
| 8,504,371 B1 | 8/2013 | Vacek et al. |
| 8,531,501 B2 | 9/2013 | Portman et al. |
| 8,583,434 B2 | 11/2013 | Gallino |
| 8,626,753 B1 | 1/2014 | Aggarwal et al. |
| 8,805,717 B2 | 8/2014 | Fleming et al. |
| 8,965,765 B2 | 2/2015 | Zweig et al. |
| 2002/0002460 A1 | 1/2002 | Pertrushin |
| 2002/0156626 A1* | 10/2002 | Hutchison .................... 704/231 |
| 2003/0055654 A1 | 3/2003 | Oudeyer |
| 2003/0088421 A1* | 5/2003 | Maes et al. ................. 704/270.1 |
| 2003/0154072 A1* | 8/2003 | Young et al. ...................... 704/9 |
| 2004/0068406 A1 | 4/2004 | Maekawa et al. |
| 2004/0098265 A1 | 5/2004 | Kelly et al. |
| 2005/0170326 A1 | 8/2005 | Koehler et al. |
| 2005/0216269 A1 | 9/2005 | Scahill et al. |
| 2005/0221268 A1 | 10/2005 | Chaar et al. |
| 2006/0074689 A1 | 4/2006 | Cosatto et al. |
| 2006/0080107 A1 | 4/2006 | Hill et al. |
| 2006/0179064 A1 | 8/2006 | Paz et al. |
| 2006/0235690 A1 | 10/2006 | Tomasic et al. |
| 2007/0011005 A1 | 1/2007 | Morrison et al. |
| 2007/0016580 A1 | 1/2007 | Mann et al. |
| 2007/0043608 A1 | 2/2007 | May et al. |
| 2007/0071206 A1 | 3/2007 | Gainsboro et al. |
| 2007/0198249 A1 | 8/2007 | Adachi et al. |
| 2007/0198330 A1 | 8/2007 | Korenblit et al. |
| 2007/0211881 A1 | 9/2007 | Parker-Stephen |
| 2007/0287477 A1* | 12/2007 | Tran ............................... 455/466 |
| 2008/0022211 A1 | 1/2008 | Jones et al. |
| 2008/0080698 A1 | 4/2008 | Williams et al. |
| 2008/0082329 A1 | 4/2008 | Watson |
| 2008/0082330 A1 | 4/2008 | Blair |
| 2008/0082341 A1 | 4/2008 | Blair |
| 2008/0097985 A1 | 4/2008 | Olstad et al. |
| 2008/0177538 A1 | 7/2008 | Roy et al. |
| 2008/0195385 A1 | 8/2008 | Pereg et al. |
| 2008/0215543 A1 | 9/2008 | Huang et al. |
| 2008/0235018 A1 | 9/2008 | Eggen et al. |
| 2008/0249764 A1 | 10/2008 | Huang et al. |
| 2008/0281581 A1 | 11/2008 | Henshaw et al. |
| 2009/0087822 A1 | 4/2009 | Stanton et al. |
| 2009/0092241 A1 | 4/2009 | Minert et al. |
| 2009/0119268 A1 | 5/2009 | Bandaru et al. |
| 2009/0138262 A1 | 5/2009 | Agarwal et al. |
| 2009/0222551 A1 | 9/2009 | Neely et al. |
| 2009/0228264 A1 | 9/2009 | Williams et al. |
| 2009/0228428 A1 | 9/2009 | Dan et al. |
| 2009/0248399 A1 | 10/2009 | Au |
| 2009/0258333 A1 | 10/2009 | Yu |
| 2009/0265332 A1 | 10/2009 | Mushtaq et al. |
| 2009/0292538 A1 | 11/2009 | Barnish |
| 2009/0313016 A1 | 12/2009 | Cevik et al. |
| 2009/0327279 A1 | 12/2009 | Adachi et al. |
| 2010/0005081 A1 | 1/2010 | Bennett |
| 2010/0076765 A1 | 3/2010 | Zweig et al. |
| 2010/0091954 A1 | 4/2010 | Dayanidhi et al. |
| 2010/0098225 A1 | 4/2010 | Ashton et al. |
| 2010/0104086 A1 | 4/2010 | Park |
| 2010/0104087 A1 | 4/2010 | Byrd et al. |
| 2010/0119053 A1 | 5/2010 | Goeldi |
| 2010/0121857 A1 | 5/2010 | Elmore et al. |
| 2010/0145940 A1 | 6/2010 | Chen et al. |
| 2010/0161315 A1 | 6/2010 | Melamed et al. |
| 2010/0198584 A1 | 8/2010 | Habu et al. |
| 2010/0246799 A1 | 9/2010 | Lubowich et al. |
| 2010/0253792 A1 | 10/2010 | Kawaguchi et al. |
| 2010/0262454 A1 | 10/2010 | Sommer et al. |
| 2010/0274618 A1 | 10/2010 | Byrd et al. |
| 2010/0329437 A1 | 12/2010 | Jeffs et al. |
| 2010/0332287 A1 | 12/2010 | Gates et al. |
| 2011/0010173 A1 | 1/2011 | Scott et al. |
| 2011/0055223 A1 | 3/2011 | Elmore et al. |
| 2011/0078167 A1 | 3/2011 | Sundaresan et al. |
| 2011/0082874 A1 | 4/2011 | Gainsboro et al. |
| 2011/0093479 A1 | 4/2011 | Fuchs |
| 2011/0178803 A1 | 7/2011 | Petrushin |
| 2011/0191106 A1 | 8/2011 | Khor et al. |
| 2011/0196677 A1 | 8/2011 | Deshmukh et al. |
| 2011/0208522 A1 | 8/2011 | Pereg et al. |
| 2011/0216905 A1 | 9/2011 | Gavalda et al. |
| 2011/0225115 A1 | 9/2011 | Moitra et al. |
| 2011/0238670 A1 | 9/2011 | Mercuri |
| 2011/0246442 A1 | 10/2011 | Bartell |
| 2011/0249811 A1 | 10/2011 | Conway et al. |
| 2011/0282661 A1 | 11/2011 | Dobry et al. |
| 2011/0307257 A1 | 12/2011 | Pereg et al. |
| 2012/0046938 A1 | 2/2012 | Godbole et al. |
| 2012/0130771 A1 | 5/2012 | Kannan et al. |
| 2012/0131021 A1 | 5/2012 | Blair-Goldensohn et al. |
| 2012/0143597 A1 | 6/2012 | Mushtaq et al. |
| 2012/0215535 A1 | 8/2012 | Wasserblat et al. |
| 2012/0245942 A1 | 9/2012 | Zechner et al. |
| 2012/0253792 A1 | 10/2012 | Bespalov et al. |
| 2013/0018875 A1 | 1/2013 | Qiao |
| 2013/0204613 A1 | 8/2013 | Godbole et al. |
| 2013/0297581 A1 | 11/2013 | Ghosh et al. |
| 2013/0297619 A1 | 11/2013 | Chandrasekaran et al. |
| 2014/0012863 A1 | 1/2014 | Sundaresan et al. |
| 2014/0067390 A1 | 3/2014 | Webb |

* cited by examiner

MULTI-PASS SPEECH ANALYTICS

RELATED APPLICATIONS

This application is a continuation application of and claims priority to U.S. patent application Ser. No. 11/924,201, filed on Oct. 25, 2007, which is a continuation of U.S. patent application Ser. No. 11/540,322, titled MULTI-PASS SPEECH ANALYTICS, filed on Sep. 29, 2006, and which is hereby incorporated by reference in its entirety. No new matter has been added.

BACKGROUND

As communication technologies have improved, businesses and individuals have desired greater functionality in their communication networks. As a nonlimiting example, many businesses have created call center infrastructures in which a customer or other user can call to receive information related to the business. As customers call into the call center, the customer may be connected with a customer service representative to provide the desired information. Depending on the time of call, the subject matter of the call, and/or other data, the customer may be connected with different customer service representatives. As such, depending on these and/or other factors, the customer may be provided with varying levels of customer service with respect to the interaction with the customer service representative. Because most businesses desire to provide the highest possible quality of customer service, many businesses have turned to recording the communication between the customer and the customer service representative. While recording this data has proven beneficial in many cases, many businesses receive call volumes that inhibit the business from reviewing all of the call data received.

As such, many businesses have turned to speech recognition technology to capture the recorded communication data and thereby provide a textual document for review of the communication. While textual documentation of a communication has also proven beneficial, similar issues may exist in that the sheer amount of data may be such that review of the data is impractical.

To combat this problem, a number of businesses have also implemented analytics technologies to analyze the speech-recognized communications. One such technology that has emerged includes large vocabulary continuous speech recognition (LVCSR). LVCSR technologies often convert received audio from the communications into an English translation of the communication in a textual document. From the textual document, analytics may be provided to determine various data related to the communication. Additionally, phonetic speech recognition may be utilized for capturing the communication data.

While these and technologies may provide a mechanism for capturing communication data, oftentimes, the shear amount of data for processing may consume extensive hardware resources. As such, a solution to increase speed and/or reduce resource consumption is desired.

SUMMARY

Included are embodiments for multi-pass analytics. At least one embodiment of a method includes receiving audio data associated with a communication, performing first tier speech to text analytics on the received audio data, and performing second tier speech to text analytics on the received audio.

Also included are embodiments of a system for multi-pass analytics. At least one embodiment of a system includes a receiving component configured to receive audio data associated with a communication and a first tier speech to text analytics component configured to perform first tier speech to text analytics on the received audio data. Some embodiments include a second tier speech to text analytics component configured to, in response to determining, perform second tier speech to text analytics on the received audio.

Also included are embodiments of a computer readable medium for multi-pass analytics. At least one embodiment includes receiving logic configured to receive audio data associated with a communication and first tier speech to text analytics logic configured to perform first tier speech to text analytics on the received audio data. Some embodiments include second tier speech to text analytics logic configured to, in response to determining, perform second tier speech to text analytics on the received audio.

Other systems, methods, features, and advantages of this disclosure will be or become apparent to one with skill in the art upon examination of the following drawings and detailed description. It is intended that all such additional systems, methods, features, and advantages be included within this description, be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included are embodiments for increasing the speed of speech to text conversion and related analytics. More specifically, in at least one embodiment, first tier speech to text analytics and second tier speech to text analytics are used. In other embodiments, a first tier may be configured for speech to text conversion and a second tier may be configured for speech to text analytics. Other embodiments are also included, as discussed with reference to the drawings.

Figure 1:
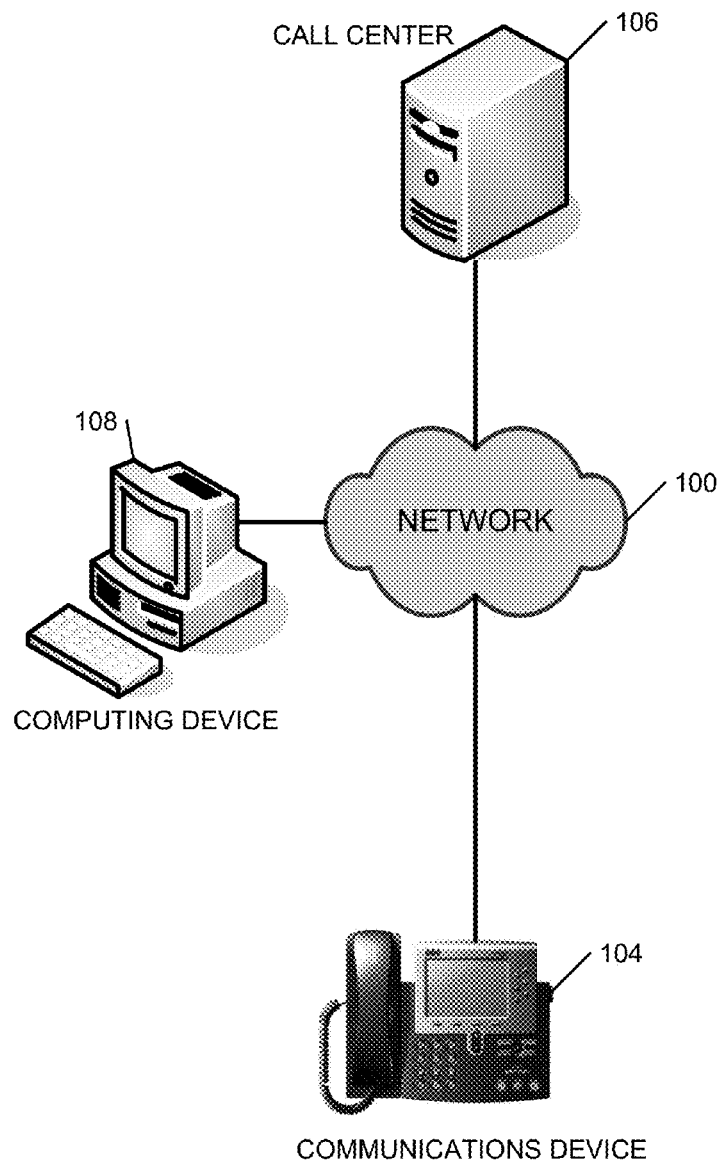
FIG. 1 is an exemplary embodiment of a system in which a user may be provided with customer service.

FIG. 1 is a nonlimiting example of a system in which a user may be provided with customer service. As illustrated in this nonlimiting example, a caller can initiate a communication request from a communications device 104. The communications request can be sent to call center 106 via network 100. Network 100 may include a Public Switched Telephone Network (PSTN), an Internet Protocol (IP) network, a cellular network, an Integrated Services Digital Network (ISDN), a Time Division Multiplexing (TDM) network, and/or other networks. Upon connecting with call center 106, a user at communications device 104 may facilitate a communication with a customer service representative. Additionally, during the communication, the communication can be recorded, such that a business associated with call center 106 can determine the quality of customer service provided to the user of communications device 104.

While in some configurations, an audio recording can be provided to an analyst to determine the quality of customer service, some embodiments may include a text to voice conversion of the communication. Large Vocabulary Continuous Speech Recognition (LVCSR) may be utilized to create an English translated textual document associated with the communication. While an LVCSR speech recognized textual document may provide enhanced searching capabilities related to the communication, depending on an accuracy threshold, LVCSR technologies may be slow in execution. Similarly, in many phonetic technologies for speech recognition, processing of search functions associated with the communication may be slow.

Additionally, while a user can send a communication request via communication device 104, some embodiments may provide that a user utilizing computing device 108 may initiate a communication to call center 106 via network 100. In such configurations, a user may utilize a soft phone and/or other communications logic provided for initiating and facilitating a communication.

One souls also note that a call center can include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Figure 2:
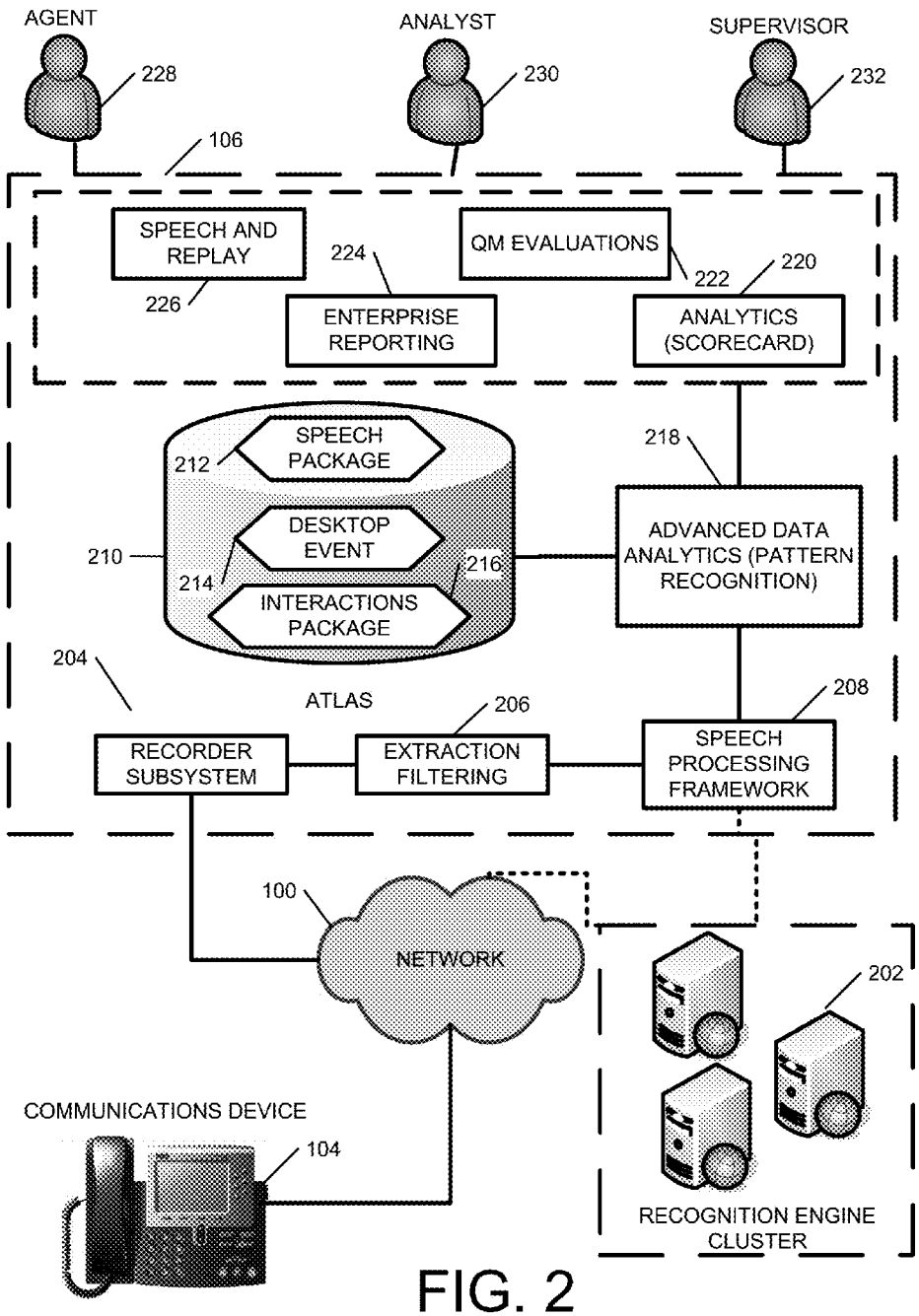
FIG. 2 is an exemplary embodiment of a recording network configuration, in which recording and analytics may be provided, similar to the network configuration from FIG. 1.

FIG. 2 is a nonlimiting example of a system for providing recording and analytics, similar to the network configuration from FIG. 1. As illustrated in the nonlimiting example of FIG. 2, communications device 104 can facilitate communications with call center 106 via network 100. Call center 106 can include one or more elements, such as a recorder subsystem component 204, an extraction filtering component 206, and a speech processing firmware component 208. Also included in call center 106 is an advanced data analytics (pattern recognition) component 218 and an atlas component 210. Included in the atlas component 210 is a speech package 212, a desktop event 214, and an interactions package 216.

Call center 106 may also include an analytic scorecard 220, a quality management (QM) evaluations component 222, and enterprise reporting component 224, and a speech and replay component 226. An agent 228 can utilize one or more of the components of call center 106 to facilitate a communication with a caller on communications device 104. Similarly, an analyst 230 can utilize one or more components of call center 106 to analyze the quality of the communications between the agent 228 and the caller associated with communications device 104. A supervisor 232 may also have access to components of call center 106 to oversee the agent 228 and/or the analyst 230 and their interactions with a caller on communications device 104.

Additionally, a recognition engine cluster 202 may be coupled to call center 106 directly and/or via network 100. Recognition engine cluster 202 may include one or more servers that may provide speech recognition functionality to call center 106. In operation, a communication between a caller on communications device 104 and an agent 228, via network 100, may first be received by a recorder subsystem component 204. Recorder subsystem component 204 may record the communications in an audio format. The recorder audio may then be sent to an extraction filtering component 206 which may be configured to extract the dialogue (e.g., remove noise and other unwanted sounds) from the recording. The recorded communication can then be sent to a speech-processing framework component 208 for converting the recorded audio communication into a textual format. Conversion of the audio into a textual format may be facilitated by a recognition engine cluster 202, however this is not a requirement. Regardless, conversion from the audio format to a textual format may be facilitated via LVCSR speech recognition technologies and/or phonetic speech recognition technologies, as discussed in more detail below.

Upon conversion from audio to a textual format, data related to the communication may be provided to advanced data analytics (pattern recognition) component 218. Advanced data analytics component 218 may be configured to provide analysis associated with the speech to text converted communication to determine the quality of customer service provided to the caller of communications device 104. Advanced data analytics component 218 may utilize atlas component 210 for facilitation of this analysis. More specifically, atlas component 210 may include a speech package component 212 that may be configured to analyze various patterns in the speech of the caller of communications device 104. Similarly, desktop event component 214 may be configured to analyze one or more actions that the user of communications device takes on their communications device 104. More specifically, a network 100 may facilitate communications in an IP network. As such, communications device 104 may facilitate both audio and/or data communications that may include audio, video, images, and/or other data. Additionally, advanced data analytics component 218 may utilize an actions package 216 to determine various components of the interaction between agent 228 and the caller of communications device 104. Advanced data analytics component 218 may then make a determination based on predetermined criteria of the quality of call service provided by agent 220.

Advanced data analytics component 218 may then facilitate creation of an analytic scorecard 220 and provide enterprise reporting 224. Additionally, call center may provide quality management evaluations 222, as well as speech and replay communications 226. This data may be viewed by an agent 228, an analyst 230, and/or a supervisor 232. Additionally, as discussed in more detail below, an analyst 230 may further analyze the data to provide a basis for advanced data analytics component 218 to determine the quality of customer service.

Figure 3:
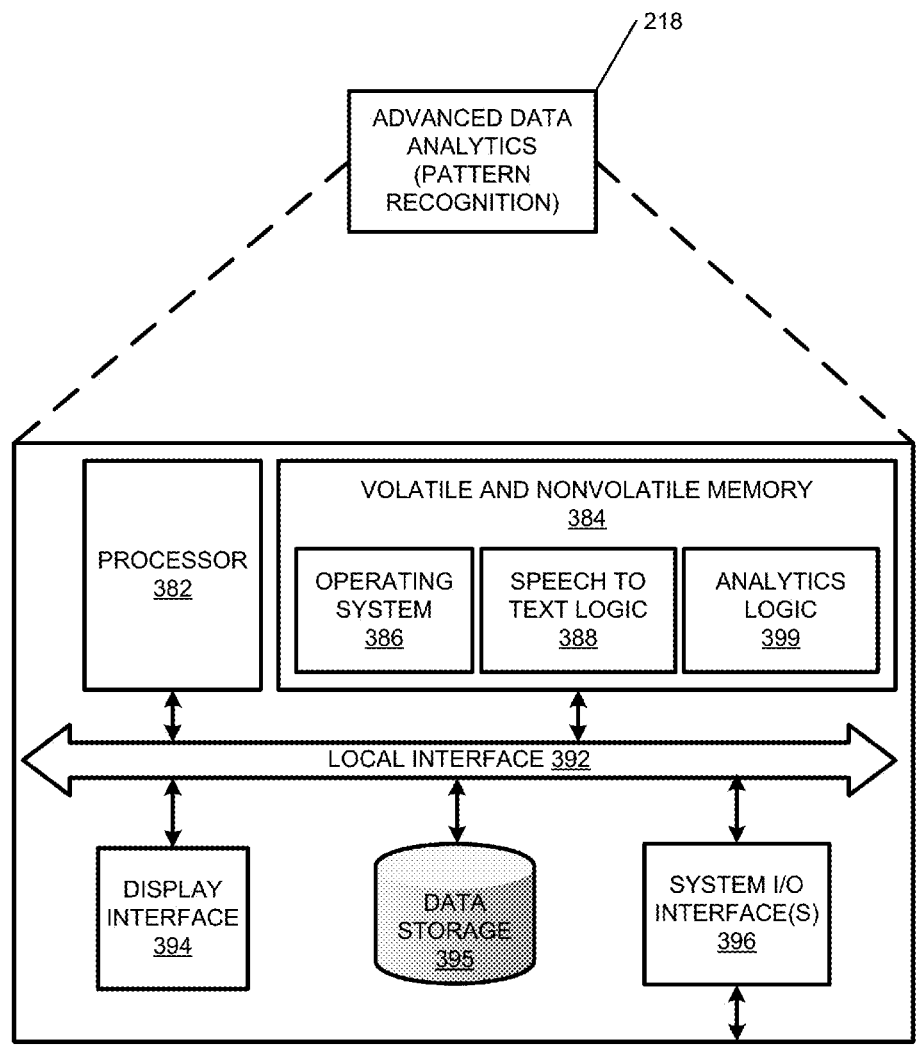
FIG. 3 is a functional block diagram illustrating an exemplary embodiment of an analytic component, similar to the analytic component from FIG. 2.

FIG. 3 is a functional block diagram illustrating an analytic component, similar to the analytic component from FIG. 2. Although a wire-line communications device is illustrated, this discussion can be applied to any device configured for receiving and/or sending data. As illustrated in FIG. 3, in terms of hardware architecture, advanced data analytics component 218 includes a processor 382, volatile and nonvolatile memory 384, a display interface 394, data storage 395, and one or more input and/or output (I/O) device interface(s) 396 that are communicatively coupled via a local interface 392. The local interface 392 can include, for example but not limited to, one or more buses and/or other wired or wireless connections. The local interface 392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 382 may be a hardware device for executing software, particularly software stored in volatile and nonvolatile memory 384.

The processor 382 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing software instructions.

The volatile and nonvolatile memory 384 can include any one or combination of volatile memory elements (e.g., random access memory (RAM, such as DRAM, SRAM, SDRAM, VRAM, etc.)) and nonvolatile memory elements (e.g., ROM, hard drive, tape, CD-ROM, etc.). Moreover, the memory 384 may incorporate electronic, magnetic, optical, and/or other types of storage media. Note that the volatile and nonvolatile memory 384 can also have a distributed architecture, where various components are situated remotely from one another, but can be accessed by the processor 382.

The software in volatile and nonvolatile memory 384 may include one or more separate programs, each of which includes an ordered listing of executable instructions for implementing logical functions. In the example of FIG. 3, the software in the volatile and nonvolatile memory 384 may include speech to text logic 388, analytics logic 399, as well as an operating system 386. Additionally, while logic components 386, 388, and 390 are each illustrated in this nonlimiting example as a single piece of logic, as one of ordinary skill in the art will understand, these components can include one or more separate software, hardware, or firmware modules. Similarly, one or more of these logical components can be combined to provide the desired functionality. Additionally, the operating system 386 may be configured to control the execution of other computer programs and may be configured to provide scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the Operating System 386.

The Input/Output devices that may be coupled to system I/O Interface(s) 396 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem for accessing another device, system, or network), a radio frequency (RF) or other transceiver, a telephonic interface, a bridge, a router, etc. Similarly, network interface 388, which is coupled to local interface 392 can be configured to communication with a communications network, such as the network from FIGS. 2 and 3. While this communication may be facilitated via a communications device, such as communications device 106, this is not a requirement.

If the computing device 104 is a personal computer, workstation, or the like, the software in the volatile and nonvolatile memory 384 may further include a basic input output system (BIOS) (omitted for simplicity). The BIOS is a set of software routines that initialize and test hardware at startup, start the Operating System 386, and support the transfer of data among the hardware devices. The BIOS is stored in ROM so that the BIOS can be executed when the computing device 104 is activated.

When the computing device 104 is in operation, the processor 382 can be configured to execute software stored within the volatile and nonvolatile memory 384, to communicate data to and from the volatile and nonvolatile memory 384, and to generally control operations of the computing device 104 pursuant to the software. Software in memory, in whole or in part, is read by the processor 382, perhaps buffered within the processor 382, and then executed. Additionally, one should note that while the above description is directed to a advanced data analytics component 218, other devices (such as communications device 104, computing device 108, call center 106, and/or other components) can also include the components and/or functionality described in FIG. 3.

One should also note that advanced data analytics component 218 can be configured with one or more of the components and/or logic described above with respect to analytics component 218. Additionally, analytics component 218, communications device 104, computing device 108, and/or other components of call center 106 can include voice recognition logic, voice-to-text logic, text-to-voice logic, etc. (or any permutation thereof), as well as other components and/or logic for facilitating the functionality described herein. Additionally, in some exemplary embodiments, one or more of these components can include the functionality described with respect to analytics component 218.

Figure 4:
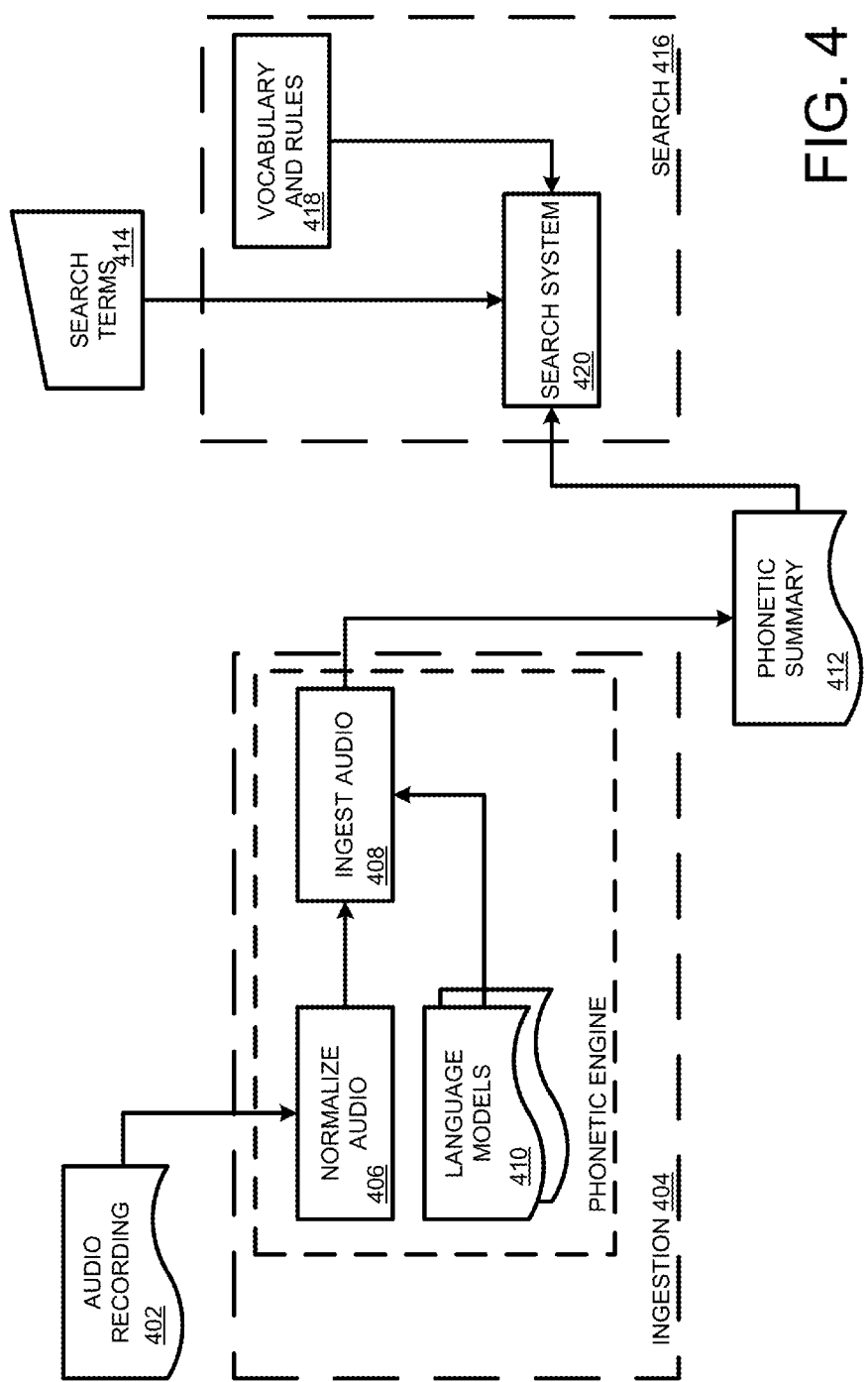
FIG. 4 is an exemplary embodiment of a functional flow diagram, illustrating components that may be utilized for a phonetics based analytic infrastructure, as may be utilized in the network of FIG. 1.

FIG. 4 is an exemplary functional flow diagram, illustrating components that may be utilized for a phonetics based analytic infrastructure, as may be utilized in the network of FIG. 1. As illustrated in the nonlimiting example of FIG. 4, the components of FIG. 4 may be included as part of call center 106. More specifically, speech recognition processing component 208 can receive an audio recording via extraction filtering component 206 and recorder subsystem component 204. Speech processing framework 208 may receive this data in an ingestion component 404 and more specifically in a normalized audio component 406. A normalized audio component 406 may be configured to facilitate the digitizing and or other processing of an audio recording. Additionally, the normalized audio component 406 (which may be part of the phonetic engine) can send normalized audio to an ingest audio component 408. The ingest audio component 408 may be configured to receive the normalized audio and one or more language models 410 for ingesting the communications data into a phonetic transcript.

More specifically, ingest audio component 408 can be configured to facilitate the creation of a phonetic transcript with one or more phonemes that occur in the communication. One embodiment of a representation of the one or more phonemes can include the designation of International Phonetic Alphabet (IPA) which may be utilized for computer use using the ISO10646 standard (UNICODE). Ingest audio component 408 can then create the phonetic transcript 412.

The phonetic transcript 412 can then be sent to a search system 420, which is part of a search component 416. The search system can also receive vocabulary and rules as designated by an analyst, such as analyst 230 from FIG. 2. Vocabulary and rules component 418 can designate one or more search trends and/or algorithms to perform in analyzing the phonetic transcript 412. Additionally, search terms 414 may be provided by analyst 230 to provide data associated with the quality of customer service provided to a caller.

As a nonlimiting example, referring to FIGS. 2 and 4, a user of communications device 104 may initiate communication with call center 106. The user of communications device 104 and an agent 228 may engage in a communication that includes the phrase "brown fox." In this communication, the agent 228 may be required to save the term "brown fox." As such, the communication can be recorded and the audio recording 402 can be sent to the base phonetic engine. The phonetic engine can apply language models 410 to ingest the audio recording at ingest audio component 408. The phonetic engine can thereby create a phonetic transcript 412.

The phonetic transcript can then be sent to a search component 416, which includes a search system 420. The search system 420 can utilize vocabulary and rules component 418, as well as receive the search terms 414. As indicated above, the search term "brown fox" can be a desired term to be found in a communication. The search system 420 can then search the phonetic transcript for the term "brown fox." As the phonetic transcript may not include an English translation of the audio recording, vocabulary and rules component 418 may be configured to provide a correlation between the search term 414 (which may be provided in English) and the phonetic representation of the desired search terms.

If the term "brown fox" appears in the phonetic transcript 412, a signal and/or scorecard can be provided to an analyst 230 to determine the quality of customer service provided by agent 228. Additionally, some embodiments can be configured to provide information to analyst 230 in the event that the term "brown fox" does not appear in the communication. Similarly, other search terms and/or search criteria may be utilized to provide data to analyst 230. Further description of phonetic speech to text conversion and analytics is disclosed in U.S. application Ser. No. 11/540,281, entitled "Speech Analysis Using Statistical Learning," which is hereby incorporated by reference in its entirety.

Figure 5:
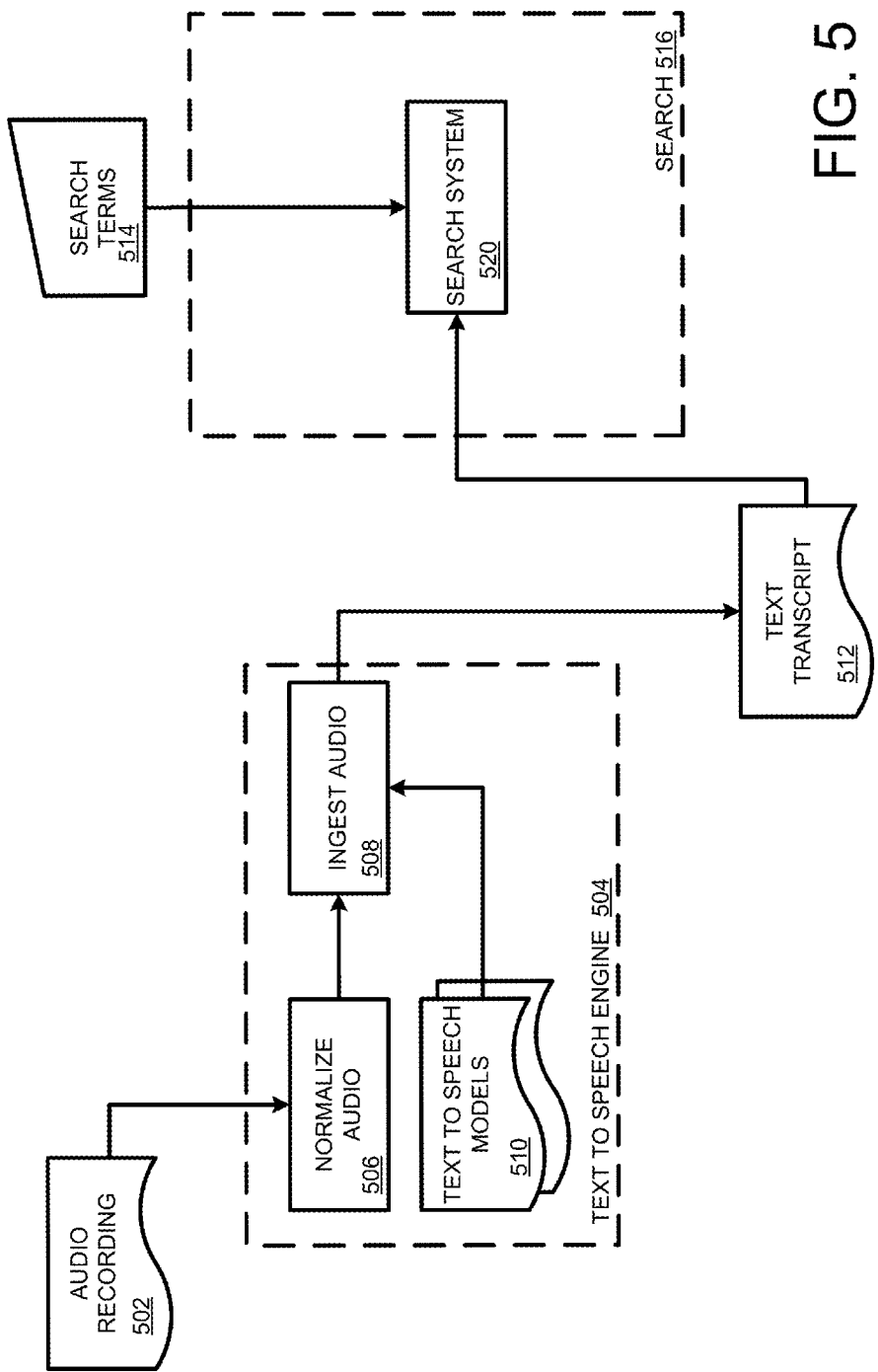
FIG. 5 is an exemplary embodiment of a functional block diagram illustrating speech recognition according to a text speech engine, similar to the diagram from FIG. 4.

FIG. 5 is an exemplary functional block diagram illustrating speech recognition according to a text speech engine, similar to the diagram from FIG. 4. As illustrated in the nonlimiting example of FIG. 5, an audio recording 502 may be provided to a text to speech engine 504, where a normalized audio component 506 may receive an audio recording, normalize the audio recording, and provide the normalized audio recording to an ingest audio component 508. Ingest audio component 508 can receive the normalized audio data, as well as text speech models 510. Ingest audio component 508 may be configured to then convert the received audio recording into a textual transcript in a desired spoken language format (English, Spanish, French, etc.). The textual transcript 512 may then be provided to a search component 516. Search system 512 (which may be part of search system 516), may receive the text transcript 512, as well as search terms 514. With search terms 514 and text transcript 512, search component 516 may be configured to determine the quality of a communication between an agent and a customer.

One should note that the nonlimiting example of FIG. 5 may be included as part of call center 106. More specifically, in at least one exemplary embodiment, one or more of the components of FIG. 5 may be included with speech processing framework 208, advanced data analytics component 218, and/or other components. Similarly, depending on the particular configuration, at least a portion of this logic may be provided with communications device 106 and/or computing device 108.

Figure 6:
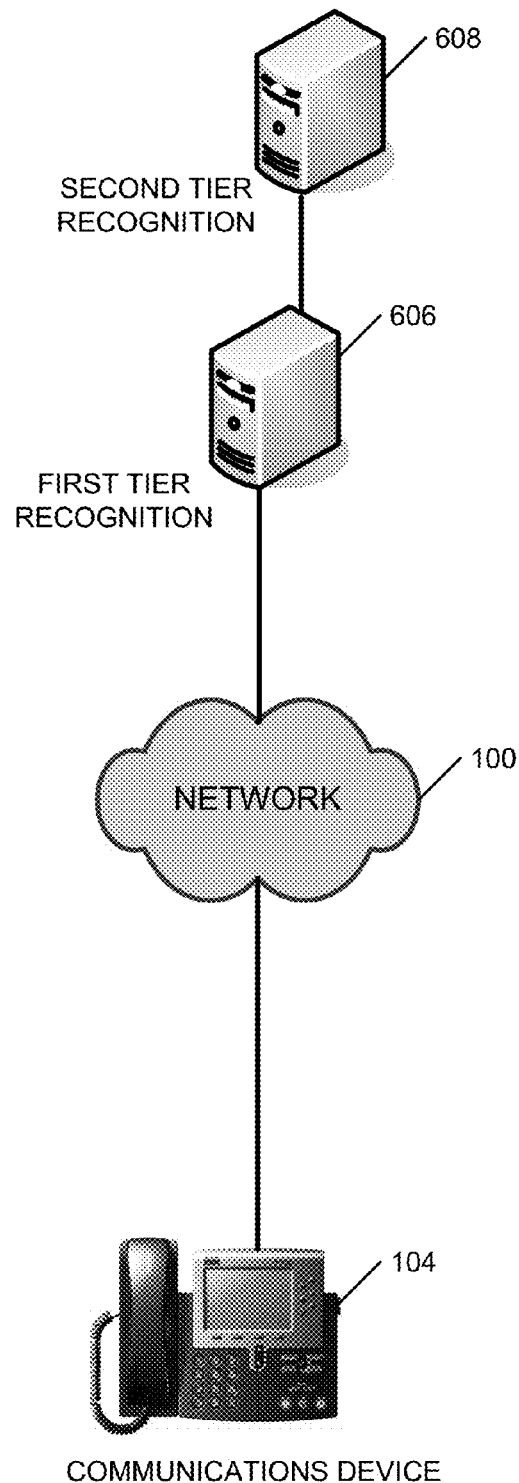
FIG. 6 is a network diagram illustrating an exemplary embodiment of a multi-tier speech recognition configuration, similar to the network configuration from FIG. 1.

FIG. 6 is a network diagram illustrating a multi-tier speech recognition configuration, similar to the network configuration from FIG. 1. As illustrated in the nonlimiting example of FIG. 6, communications device 104 may be coupled with local network 100. Additionally, a first tier recognition server 606 may be coupled to network 100. Additionally, a second tier speech recognition server 608 may be coupled to first tier recognition server 606. In operation, first tier recognition server may be configured to receive audio data associated with a communication between a user of communications device 104 and an agent 228 associated with a call center 106. First tier recognition server 606 may include a phonetic recognition server and/or a LVCSR server with a reduced accuracy rate. Regardless, first tier recognition server is configured to operate in an expedited mode, such that speech recognition and analytics of the received communication data is provided.

In at least one embodiment, the system of FIG. 6 may be configured such that first tier recognition server 606 is configured to provide speech to text conversion for received audio data. First tier recognition server 606 may be configured to convert speech to text via a phonetic engine (such as the phonetic engine described in FIG. 4) and/or via LVCSR (such as described in FIG. 5). In such a configuration, second tier recognition server 608 may be configured to provide one or more speech to text analytics for the converted audio data. This may facilitate faster operation of the network in that first tier server 606 may be configured to, in at least one embodiment, process data faster than second tier server 608. This may be accomplished via a faster computer architecture, utilization of faster speech to text recognition logic, and/or for other reasons. Similarly, some embodiments may be configured such that first tier server 606 is configured to determine the data to be sent to second tier server 608. As a subset of data received at first tier server 606 is sent to second tier server 608, the overall network performance may improve.

Similarly, some embodiments may be configured such that first tier recognition server 606 is configured to provide a precursory speech to text conversion and/or analytics. Upon recognition of a desired search term associated with the communication, first tier recognition server 606 can provide at least a portion of the communication data to second tier recognition server 608. Second tier recognition server 608 may be configured to provide a more thorough analysis (and/or conversion) of the data. As first tier server 606 may be configured to process at least a portion of the received data and send at least a portion of that data to second tier server 608, network performance may improve.

While first tier recognition server 606 is illustrated as being directly coupled to second tier recognition server 608, this is a nonlimiting example. More specifically, in at least one embodiment, first tier recognition server is coupled to network 100 and second tier recognition server is also coupled to network 100. First tier recognition server 606 may be separately located from second tier recognition server and may facilitate communications with second tier recognition server 608 via network 100. Additionally, while first tier recognition server 606 and second tier recognition server 608 are illustrated as separate components, this is also a nonlimiting example. In at least one embodiment, the functionality described with respect to first tier recognition server 606 and second tier recognition server 608 may be provided in a single component for providing the desired functionality.

Figure 7:
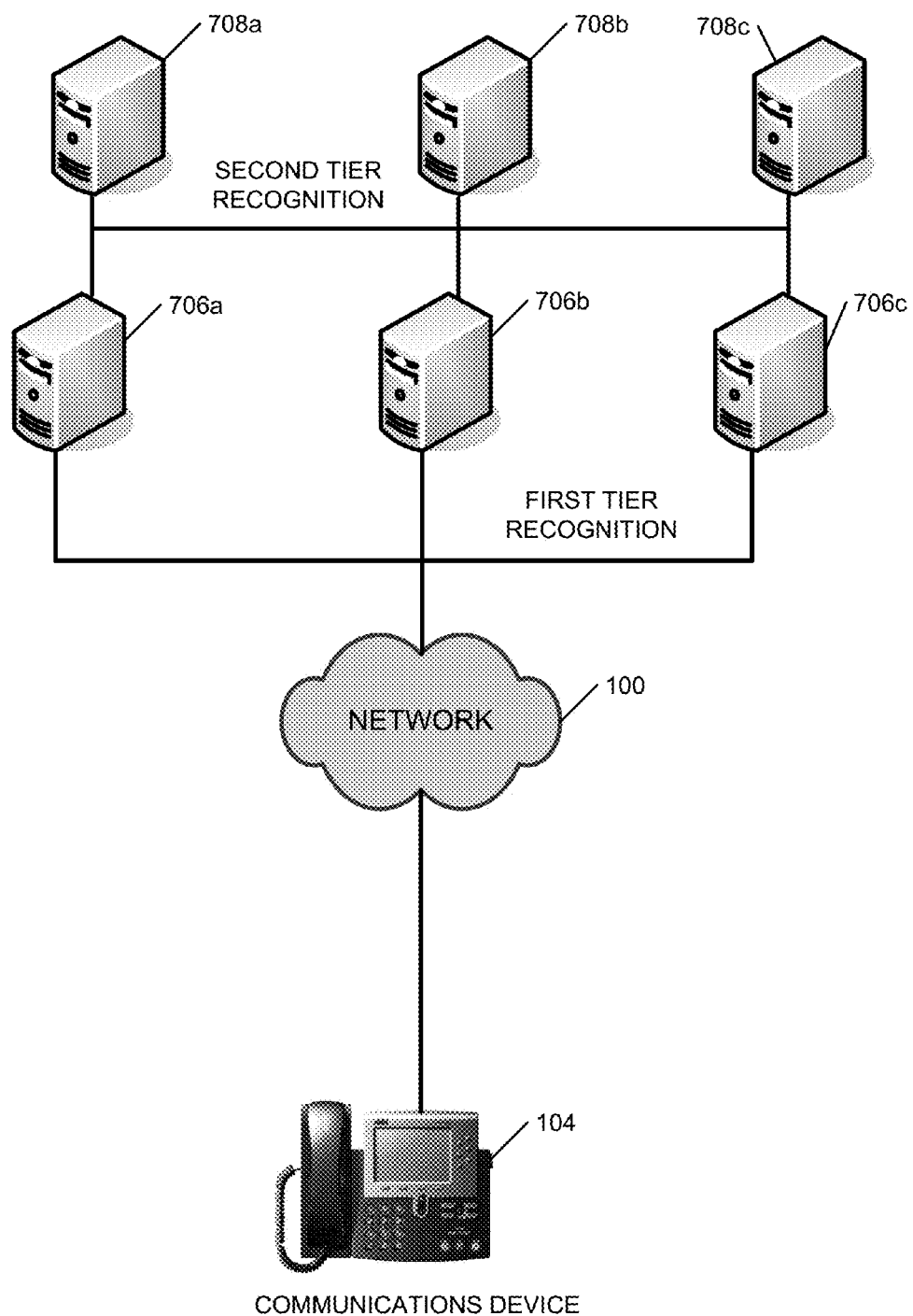
FIG. 7 is a network configuration illustrating an exemplary embodiment of a multi-tier speech recognition configuration with a plurality of servers, similar to the network configuration from FIG. 6.

FIG. 7 is an exemplary network configuration illustrating a multi-tier speech recognition configuration with a plurality of servers, similar to the network configuration from FIG. 6. As illustrated in the nonlimiting example of FIG. 7, communications device 104 is coupled to network 100. Also coupled to network 100 are first tier recognition servers 706*a*, 706*b*, and 706*c*. Similarly, coupled to first tier recognition servers 706 are first tier recognition server 708*a*, 708*b*, and 708*c*.

First tier recognition server 706 may be configured to provide one or more speech recognition and/or analytics services. As a nonlimiting example, first tier recognition server 706*a* may be configured to determine speaker identification associated with the communication. Similarly, first tier server 706*b* may be configured to provide speaker verification associated with the communication. First tier server 706*c* may be configured to determine speaker emotion. Similarly, second tier speech recognition service 708*a* may be configured to exclusively serve first tier recognition server 706*a*, however this is a nonlimiting example. More specifically, second tier speech recognition server 708*a* may be configured as a speaker identification determination server to receive data from first recognition server 706*a*. In operation, audio data may be sent to first tier speech recognition server 706*a*, which may be a phonetic speech recognition server. First tier speech recognition server 706*a* may be configured to determine at least one characteristic associated with the audio data to determine whether speaker identification may be determined. If a determination is made that speaker identification can be determined, first tier speech recognition service 706*a* may send at least a portion of the received audio data (which may be converted into a phonetic transcript and/or other form) to a second tier recognition server 708*a*. Second tier speech recognition server 708*a* may be configured to fully analyze the received data to determine the identification of the speaker.

While the nonlimiting example discussed above indicates that the second tier speech recognition server 708*a* is a dedicated server for first tier speech recognition server 706*a*, this is a nonlimiting example. More specifically, in at least one nonlimiting example, second tier recognition servers may serve one or more of the first tier speech recognition servers 706. Similarly, some embodiments can be configured such that first tier recognition server 706 may be configured to provide the initial speech recognition functionality while second tier speech recognition server 708 may be configured to provide more specific services. In this nonlimiting example, first tier speech recognition servers 706*a*, 706*b*, 706*c* may be configured to provide a speech to text conversion associated with received audio data. Upon conversion, first tier speech recognition servers 706*a*, 706*b*, and 706*c* can make a determination as to the desired analytics for the associated communication. Upon determining the desired analytics, first tier speech recognition server 706 can send the phonetic data to a second tier speech recognition server 708 associated with the desired analytic.

More specifically, if second tier speech recognition server 708*a* is a speaker identification server, one or more of the first tier recognition servers 706*a*, 706*b*, 706*c* can send data to second tier speech recognition server 708*a* upon determination that a speaker identification is required. Similarly, if second tier speech recognition server 708*b* is configured for speaker verification, speech recognition servers 706 may be configured to send communication data to second tier speech recognition server 708*b*. Other configurations are also included.

Figure 8:
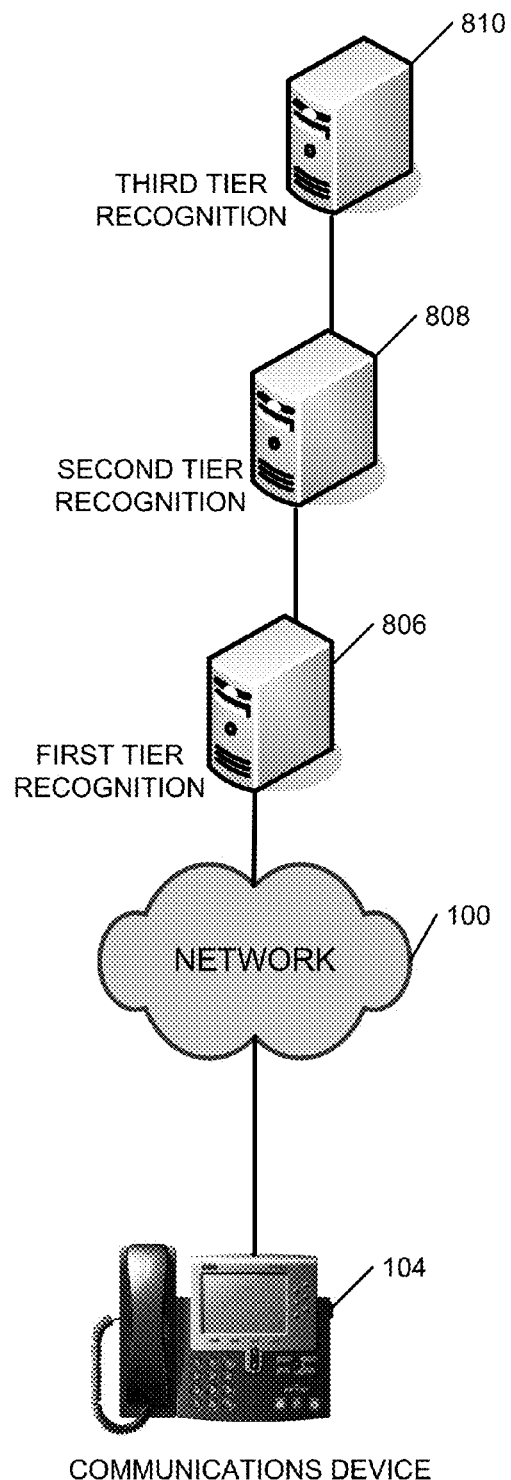
FIG. 8 is a network configuration illustrating an exemplary embodiment of a three-tier speech recognition configuration, similar to the network configuration from FIG. 7.

FIG. 8 is an exemplary network configuration illustrating a three-tier speech recognition configuration, similar to the network configuration from FIG. 7. As illustrated in the nonlimiting example of FIG. 8, communications device 104 is connected to network 100. Also connected to network 100 is a first tier speech recognition server 806. As illustrated in the previous nonlimiting examples, first tier speech recognition server 806 may be configured to provide expedited speech recognition services via a phonetics speech to text configuration and/or an LVCSR functionality with reduced accuracy such that processing of the audio data may be completed in an expedited manner.

Also included in the nonlimiting example of FIG. 8 is a second tier speech recognition server 808. Second tier speech recognition server 808 may be configured to provide speech recognition services at higher accuracy than first tier speech recognition server 806. Similarly, FIG. 8 also includes a third tier recognition server 810, which may be configured to further speech recognition analytics associated with the communication.

In operation, first tier speech recognition server 806 may be configured to receive raw data associated with a communication. First tier speech recognition server 806 may then perform expedited speech recognition services on the received data. Second tier speech recognition server 808 may include more thorough speech recognition functionality which may be slower in operation than first tier speech recognition server 806, however second tier server 808 may provide greater accuracy related to received data. Additionally, second tier speech recognition server 808 may make a determination whether a third tier speech recognition server 810 may be utilized.

Third tier speech recognition server 810 may be configured to provide services different than that of second tier speech recognition server 808. As a nonlimiting example, second tier speech recognition server 808 may be configured to determined speaker confidence associated with received audio data, while a third tier speech recognition server may be configured to determine speaker emotion associated with the received audio. As such, if information regarding both speaker emotion and speaker confidence is desired, second tier speech recognition server 808 and third tier speech recognition server 810 (as well as first tier speech recognition server 806) may be utilized.

Figure 9A:
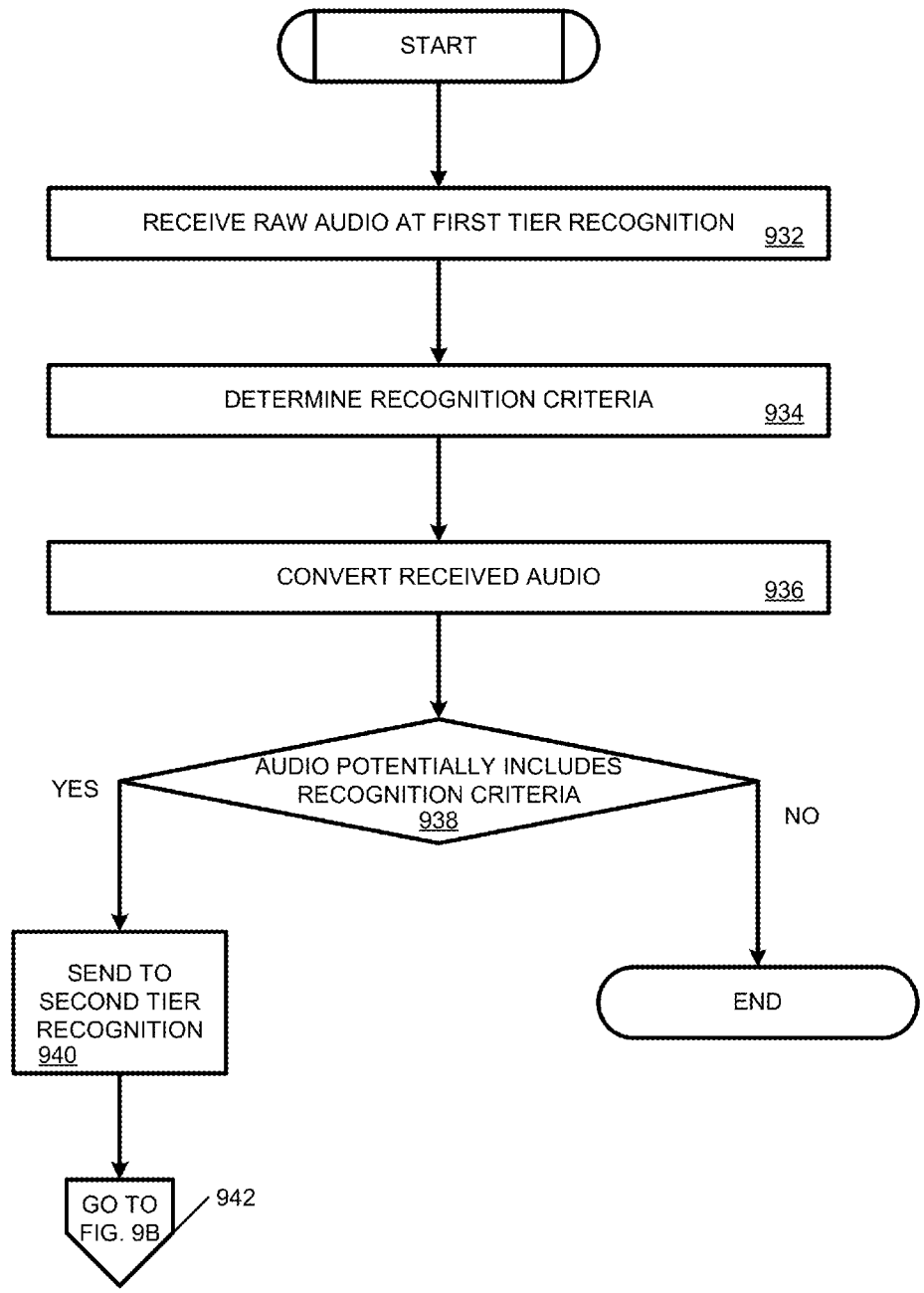
FIG. 9A is a flowchart illustrating the exemplary embodiment of a process that may be utilized to perform speech recognition functionality in a multi-tier speech recognition environment, such as the environment from FIG. 6.

FIG. 9A is a flowchart illustrating an exemplary embodiment of a process that may be utilized to perform speech recognition functionality in a multi-tier speech recognition environment, such as the environment from FIG. 6. As illustrated in the nonlimiting example of FIG. 9A, call center 106 may receive raw audio data associated with a communication on a first tier speech recognition server (block 932). Call server 106 may then determine recognition criteria (block 934). More specifically, call center 106 may be configured to determine the type of speech recognition analysis that may be performed on the received communication data. As a nonlimiting example, the received communication call center 106 may determine that the first tier speech recognition server determines speaker identification associated with communication. This indication may be received from an agent 228, analyst 230, and/or supervisor 232, depending upon the embodiment.

Call center 106 may then convert the received audio into a textual transcript (e.g., a phonetic transcript and/or a spoken language transcript and/or other type of transcript), as illustrated in block 936. Call center 106 may then determine whether the audio potentially include the recognition criteria (block 938). If the received audio data does not include the recognition criteria, the process may end. If, however, first tier speech recognition server determines that the audio potentially include the recognition criteria, first tier speech recognition server can send at least a portion of the audio (which may be converted to a phonetic and/or other transcript) to second tier speech recognition server (block 938). The flowchart then proceeds to jump block 940, which is continued in FIG. 9B.

Figure 9B:
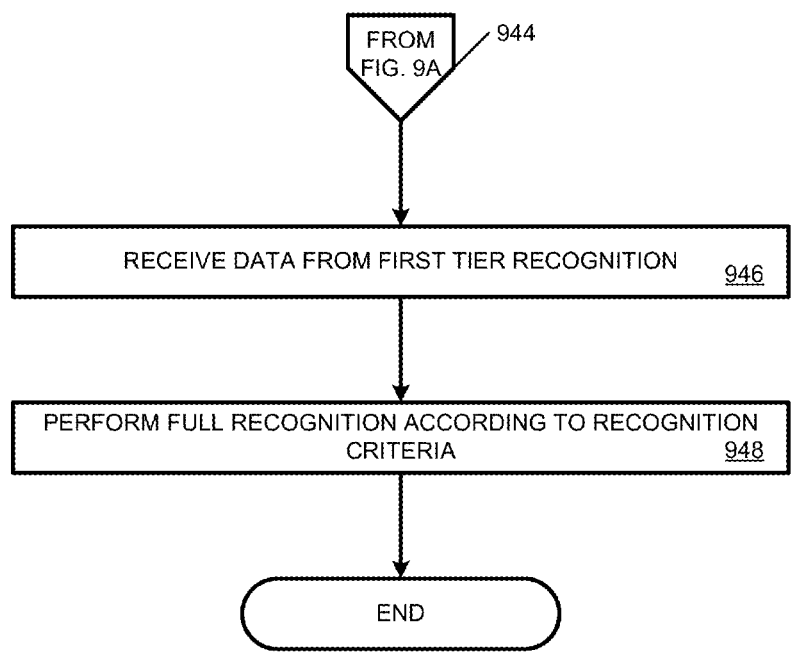
FIG. 9B is a continuation from the flowchart from FIG. 9A.

FIG. 9B is a continuation from the flowchart from FIG. 9A. As illustrated in the nonlimiting example of FIG. 9B, a flowchart begins from a jump block 942, which is continued from FIG. 9A. The call center 106 may then receive data from the first tier speech recognition server at a second tier speech recognition server (block 944). The second tier speech recognition server may then perform full recognition analytics according to the recognition criteria (block 946).

As discussed above, second tier speech recognition server may provide a more detailed speech recognition analysis of the audio data received. Similarly, some embodiments may be configured to provide a specific speech recognition analysis task such as speaker identification, speaker verification, speaker emotion, speaker confidence, and/or other types of analysis.

Figure 10A:
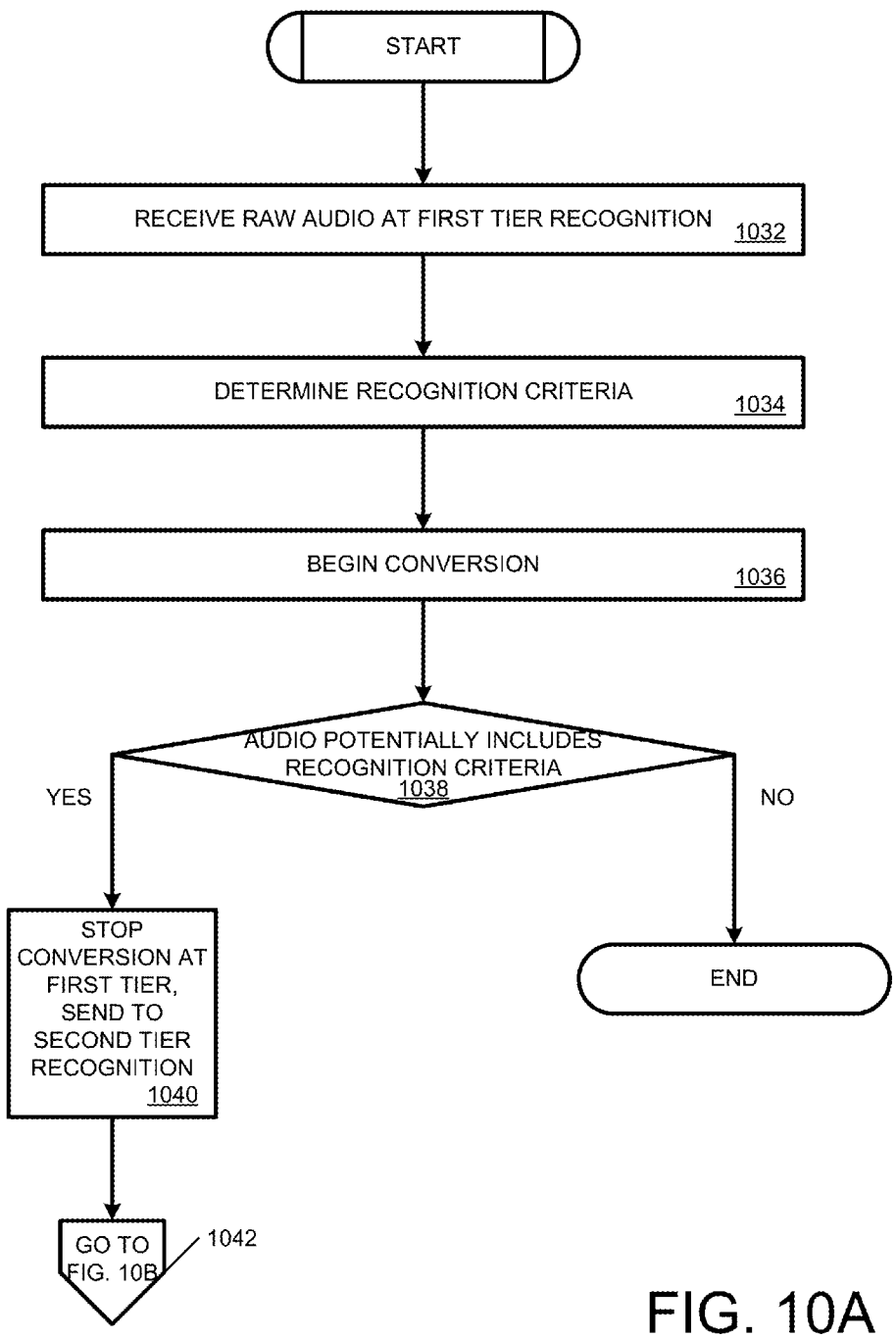
FIG. 10A is a flowchart illustrating the exemplary embodiment of a process that may be utilized for providing speech recognition in a first tier upon a determination that utilization of a second speech recognition tier is desired, similar to the flowchart from FIGS. 9A and 9B.

FIG. 10A is a flowchart illustrating the exemplary embodiment of a process that may be utilized for providing speech recognition in a first tier upon a determination that utilization of a second speech recognition tier is desired, similar to the flowchart from FIGS. 9A and 9B. As illustrated in the nonlimiting example of FIG. 10A, call center 106 may receive raw audio data at a first tier speech recognition server (block 1032). The first tier recognition server may then determine recognition criteria associated with the received audio data (block 1034). First tier speech recognition server can then begin speech to text conversion (block 1036). If at some point during the conversion, the first tier speech recognition server determines that the received valued data potentially include recognition criteria (block 1038), first tier speech recognition server can stop the conversion and send the audio data to the second tier speech recognition server (block 1040). The flowchart can then proceed to jump block 1042.

Figure 10B:
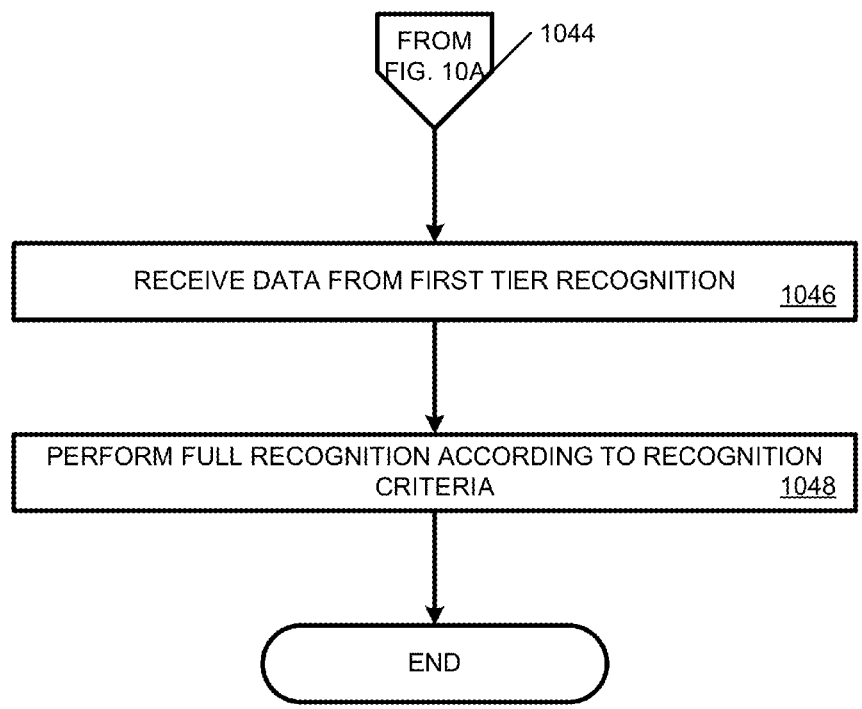
FIG. 10B is a continuation of the flowchart from FIG. 10A.

FIG. 10B is a continuation of the flowchart from FIG. 10A. As illustrated in the nonlimiting example of FIG. 10B, from jump block 1044, the second tier speech recognition server can receive data from the first tier speech recognition server (block 1046). Second tier speech recognition server can then perform full recognition according to the recognition criteria (block 1048).

As illustrated in this nonlimiting example, upon determination that the received audio contains one or more attributes associated with the determined speech criteria, according to the determined recognition criteria, first tier speech recognition server can send at least a portion of the data to the second tier speech recognition server. As such, full analysis of the received audio may be expedited.

Figure 11A:
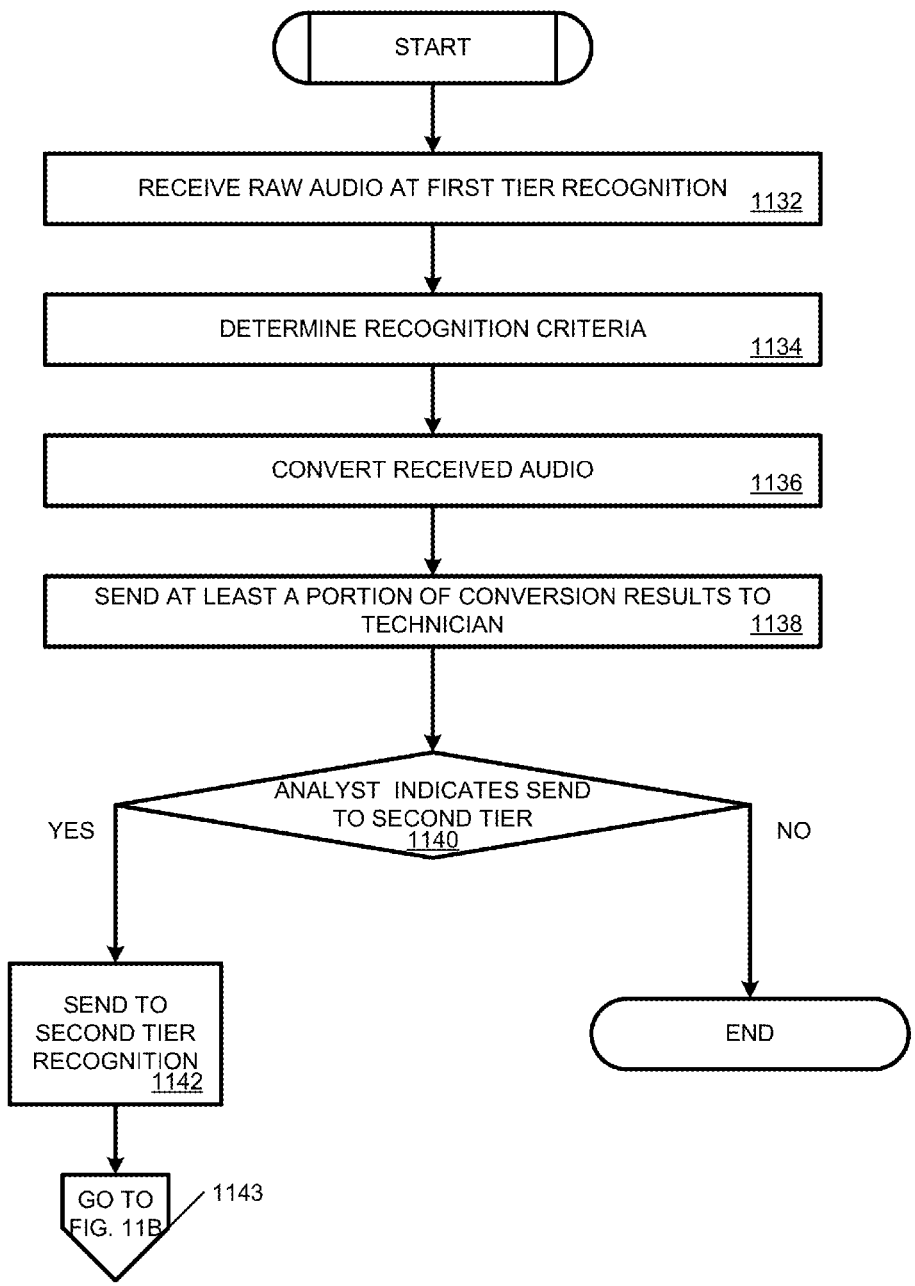
FIG. 11A is a flowchart illustrating the exemplary embodiment of a process that may be utilized for providing a user option for providing an agent an option to send audio data to a second tier speech recognition system, similar to the flowchart from FIGS. 10A and 10B.

FIG. 11A is a flowchart illustrating the exemplary embodiment of a process that may be utilized for providing a user option for providing an agent an option to send audio data to a second tier speech recognition system, similar to the flowchart from FIGS. 10A and 10B. As illustrated in the nonlimiting example of FIG. 11A, call center 106 can receive raw audio data at a first tier speech recognition server (block 1132). The first tier speech recognition server can then determine the recognition criteria associated with the received audio data (block 1134). The first tier speech recognition server can then convert the received audio into a textual format, as described above (block 1136). The first tier speech recognition server can then send at a least a portion of the conversion results to an analyst 230 (block 1138). The analyst 230 can then indicate whether to send the audio data to a second tier speech recognition server (block 1140). If the analyst 230 determines that the data need not be sent to a second tier speech recognition server, the process may end. If, however, the analyst 230 determines that further speech recognition analysis may be determined on the received audio data, the first tier speech recognition server can send at least a portion of the received audio data to a second tier speech recognition server (block 1142). Flowchart can then proceed to jump block 1143.

Figure 11B:
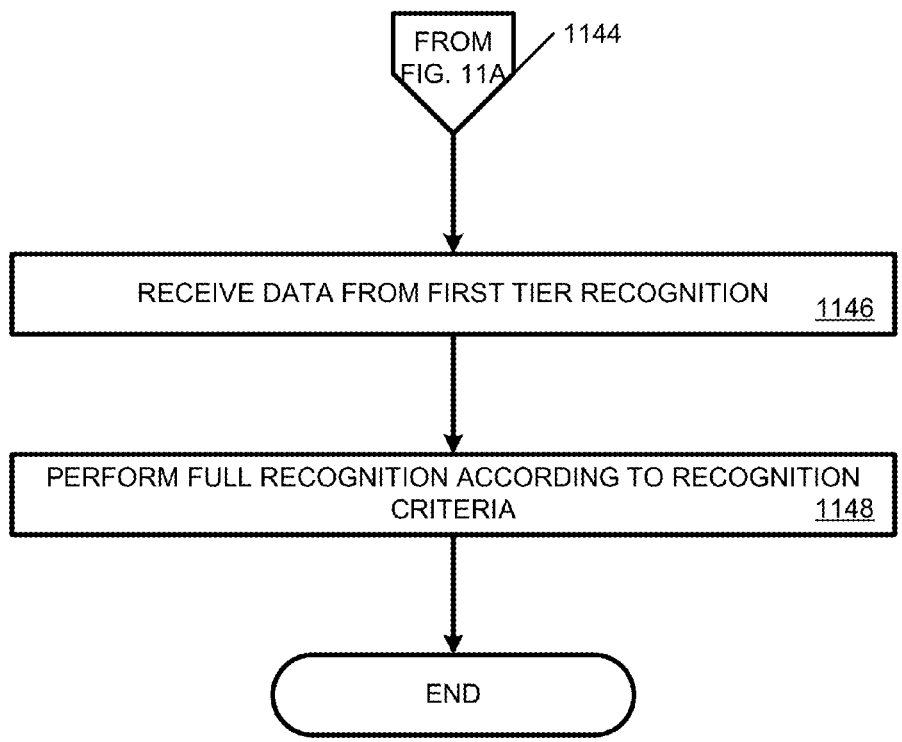
FIG. 11B is a continuation of the flowchart from FIG. 11A.

FIG. 11B is a continuation of the flowchart from FIG. 11A. As illustrated in the nonlimiting example of FIG. 11B, from jump block 1144, the second tier speech recognition server can receive at least a portion of the audio data from the first speech recognition server (block 1146). The second tier speech recognition server can then perform full recognition of the received audio data according to the recognition criteria (block 1148). As discussed above, while full recognition analytics of the received data may be performed, second tier speech recognition server may also be configured to perform specific speech recognition analytics, such as speaker identification and/or other specific speech analytics.

Figure 12A:
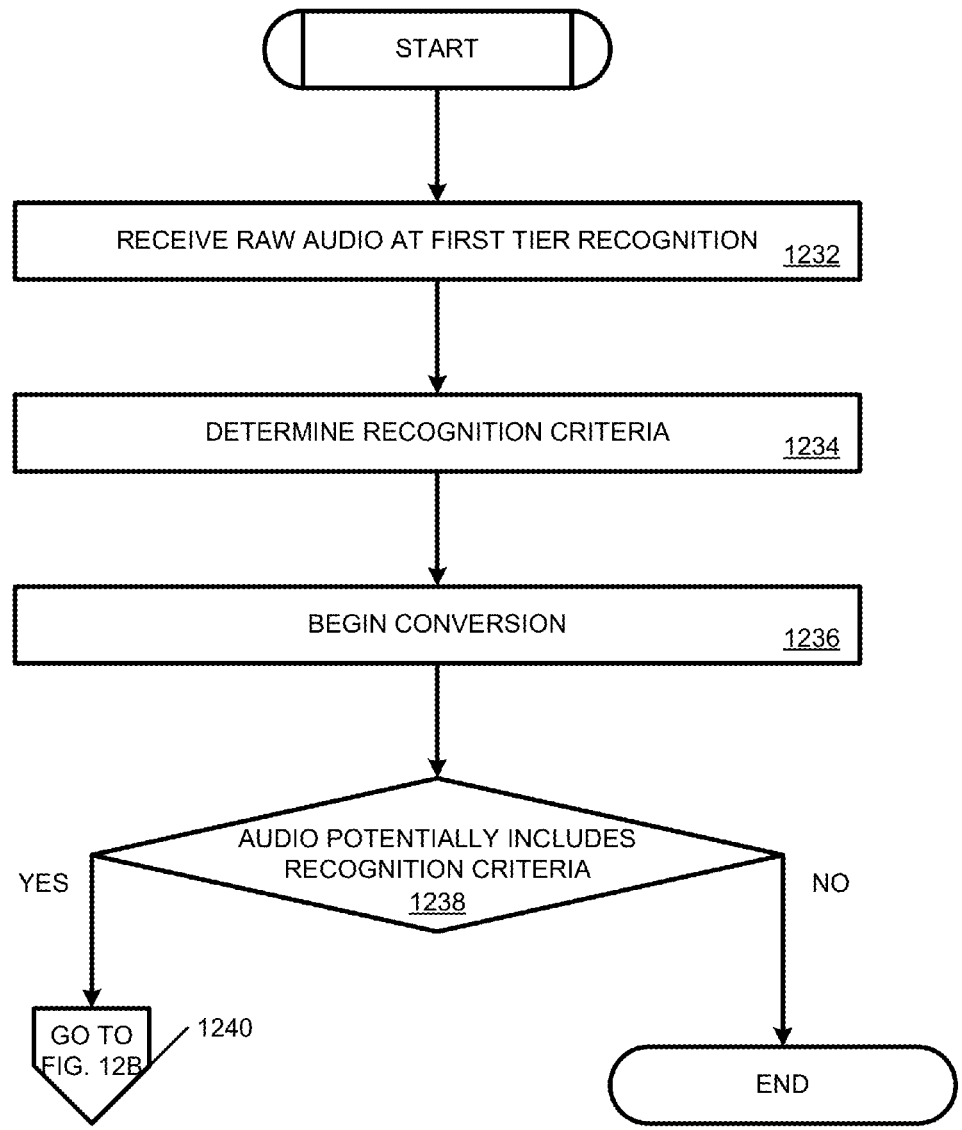
FIG. 12A is a flowchart illustrating the exemplary embodiment of a process that may be utilized for determining from a plurality of second tier speech recognition servers, which server tier direct audio data, similar to the flowchart from FIGS. 11A and 11B.

FIG. 12A is a flowchart illustrating the exemplary embodiment of a process that may be utilized for determining from a plurality of second tier speech recognition servers, which server tier direct audio data, similar to the flowchart from FIGS. 11A and 11B. As illustrated in the nonlimiting example of FIG. 12A, call center 106 can receive raw audio data at a first tier speech recognition server (block 1232). The call center 106 can then determine recognition criteria associated with the received audio data (block 1234). The first tier speech recognition server can then begin conversion of the received audio data into a textual format using phonetic speech to text conversion and/or other expedited speech to text conversion techniques (block 1236). Call center 106 may then determine whether the audio potentially include the recognition criteria (block 1238). If a determination is made that the received audio does not include the recognition criteria, the flowchart can end. If, however, a determination is made that the audio potentially include the recognition criteria, the flowchart can proceed to jump block 1240.

Figure 12B:
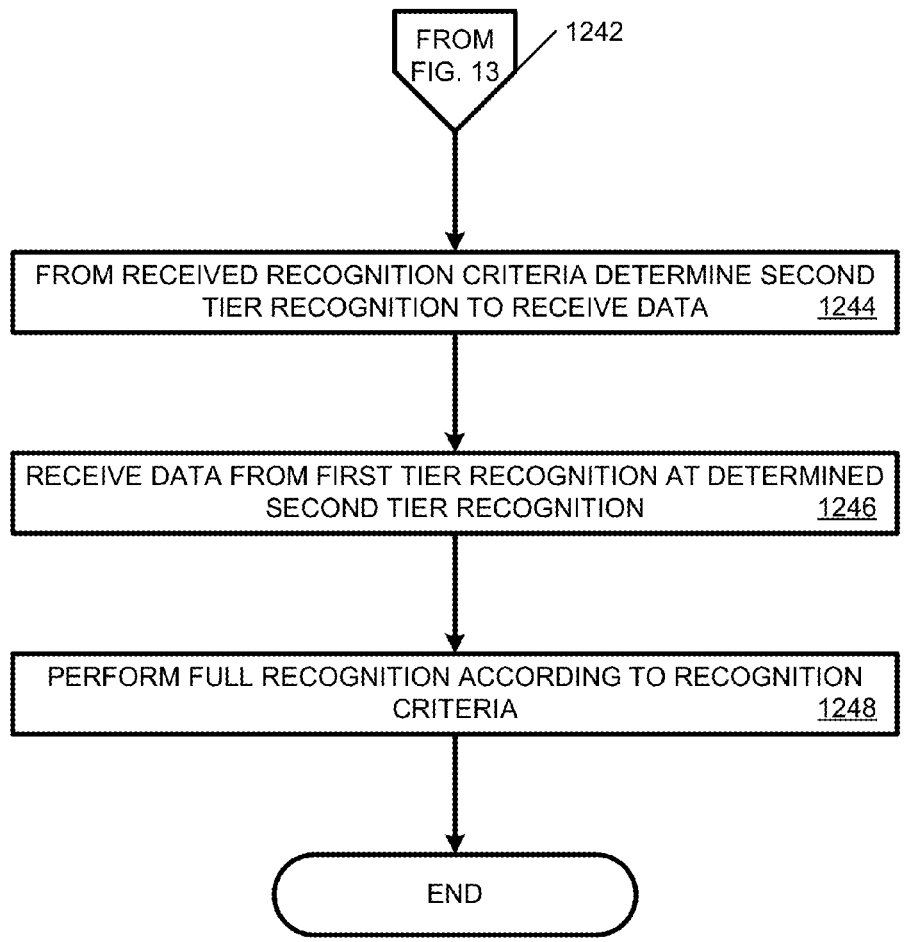
FIG. 12B is a continuation of the flowchart from FIG. 12A.

FIG. 12B is a continuation of the flowchart from FIG. 12A. As illustrated in the nonlimiting example of FIG. 12B, from jump block 1242, from the received recognition criteria, call center 106 can determine which second tier speech recognition server to be utilized for the received audio data (block 1244). Call center 106 can then receive data from the first tier speech recognition server at the determined second tier speech recognition server (block 1246). The second tier speech recognition server can then perform full recognition of the audio data according to the recognition criteria (block 1248).

It should be noted that speech analytics (i.e., the analysis of recorded speech or real-time speech) can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can improve collection effectiveness and reduce corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should also be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The embodiments disclosed herein can be implemented in hardware, software, firmware, or a combination thereof. At least one embodiment, disclosed herein is implemented in software and/or firmware that is stored in a memory and that is executed by a suitable instruction execution system. If implemented in hardware, as in an alternative embodiment disclosed herein can be implemented with any or a combination of the following technologies: a discrete logic circuit) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The invention claimed is:

1. A method of performing data analytics in a computing system, the method comprising:
receiving audio data associated with a communication from a caller to be analyzed;
performing a first analytics process by a first tier speech recognition server, the first analytics process comprising:
converting the received audio data into a phonetic transcript,
determining at least one characteristic associated with the audio data to determine whether speaker identification can be determined by a second tier speech recognition server, wherein the second tier speech recognition server is configured as a speaker identification determination server, and wherein the first tier recognition server is separately located from the second tier speech recognition server, and
if the determination is made that speaker identification can be determined by the second tier speech recognition server, sending first data comprising a portion of the phonetic transcript to the second tier recognition server; and
performing a second analytics process on the first data by the second tier speech recognition server, different than the first analytics process, the second analytics process comprising analyzing the first data to determine the identification of the speaker.

2. The method of claim 1, further comprising providing the first data to the second analytics process to perform analytics in accordance with information contained in the first data.

3. The method of claim 2, further comprising:
determining a subset of the first data in accordance with an event; and
performing analytics using the subset of the first data.

4. The method of claim 2, further comprising performing speech recognition using the first data.

5. The method of claim 1, wherein the first analytics process and the second analytics process determine different characteristics of the speech-to-text converted communication.

6. A non-transitory computer readable medium having stored thereon instructions that, when executed by a processor, direct the processor to:
receive audio data associated with a communication from a caller to be analyzed;
perform a first analytics process by a first tier speech recognition server, the first analytics processes comprising;
converting the received audio data into a phonetic transcript,
determining at least one characteristic associated with the audio data to determine whether speaker identification can be determined by a second tier speech recognition server, wherein the second tier speech recognition server is configured as a speaker identification determination server, and wherein the first tier recognition server is separately located from the second tier speech recognition server, and
if the determination is made that speaker identification can be determined by the second tier speech recognition server, sending first data comprising a portion of the phonetic text to the second tier speech recognition server; and
perform a second analytics process on the first data by the second tier recognition server, different than the first analytics process, the second analytics process comprising analyzing the first data to determine the identification of the speaker.

\* \* \* \* \*